(12) United States Patent
Law

(10) Patent No.: US 8,649,507 B2
(45) Date of Patent: Feb. 11, 2014

(54) MOBILE COMMUNICATIONS DEVICE ENCLOSURE

(75) Inventor: Henry Law, Orange, CA (US)

(73) Assignee: Belkin International, Inc., Playa Vista, CA (US)

( * ) Notice: Subject to any disclaimer, the term of this patent is extended or adjusted under 35 U.S.C. 154(b) by 487 days.

(21) Appl. No.: 12/726,312

(22) Filed: Mar. 17, 2010

(65) Prior Publication Data
US 2010/0244638 A1 Sep. 30, 2010

Related U.S. Application Data

(60) Provisional application No. 61/160,801, filed on Mar. 17, 2009.

(51) Int. Cl.
*H04M 9/00* (2006.01)

(52) U.S. Cl.
USPC ........ 379/440; 379/453; 455/90.3; 455/575.4

(58) Field of Classification Search
USPC .......... 379/447, 426, 428.01, 433.11–433.13, 379/440, 441, 449, 453, 455; 455/575.1, 455/575.8, 90.3, 575.4; D14/202, 250, 345, D14/425, 440, 477, 479, 480.5, 480.6, 501
See application file for complete search history.

(56) References Cited

U.S. PATENT DOCUMENTS

| | | |
|---|---|---|
| 6,176,401 B1 | 1/2001 | Lim |
| 6,701,159 B1 | 3/2004 | Powell |
| 2002/0127370 A1 | 9/2002 | Ruck |
| 2003/0036362 A1 | 2/2003 | Buesseler et al. |
| 2003/0068035 A1 | 4/2003 | Pirila et al. |
| 2007/0060224 A1 | 3/2007 | Liu |

FOREIGN PATENT DOCUMENTS

WO 2009 018345 2/2009

OTHER PUBLICATIONS

PCT Search Report dated Jul. 7, 2010 for Application No. PCT/US2010/027733, 5 pages.

*Primary Examiner* — MD S Elahee
(74) *Attorney, Agent, or Firm* — Bryan Cave LLP

(57) ABSTRACT

In some embodiments, a mobile media device enclosure can be configured to receive a mobile media device. The mobile media device enclosure can include: (a) a rigid portion, the rigid portion including a back wall and one or more sidewalls, the back wall and the one or more sidewalls defining an interior and an exterior of the mobile media device enclosure, the rigid portion configured to receive the mobile media device within the interior of the mobile media device enclosure; and (b) an ejection tab located at the back wall of the rigid portion, the ejection tab at least partially defined by a channel traversing from a first point in the rigid portion to a second point in the rigid portion, the ejection tab having a fixed portion and a moveable portion, the fixed portion of the ejection tab is mechanically coupled to the rigid portion, the movable portion of the ejection tab has a first portion mechanically coupled to the fixed portion of the ejection tab and a second portion at least partially defined by the channel. The movable portion of the ejection tab is configured to flexibly maintain a first position substantially parallel to an orientation of the back wall of the rigid portion, and the movable portion of the ejection tab is further configured to flexibly maintain a second position partially within the interior of the rigid portion when sufficient force is applied to the exterior of the rigid portion at the second portion of the movable portion of the ejection tab. Other embodiments and related methods are also disclosed herein.

26 Claims, 11 Drawing Sheets

MOBILE COMMUNICATIONS DEVICE ENCLOSURE

CROSS REFERENCE TO RELATED APPLICATION

This application claims priority to U.S. Provisional Patent Application 61/160,801, filed on Mar. 17, 2009, the contents of which are incorporated herein by reference.

FIELD OF THE INVENTION

This invention relates generally to portable device enclosures, and relates, more particularly, a case/enclosure for a portable media player or smartphone including apparatuses and related methods thereto.

BACKGROUND

The portable media player market has changed dramatically in the past several years and with it, the portable media player enclosure market. Recent trends have focused on the emergence of the smartphone, which simply put is a handheld phone incorporating several additional features not found in traditional handheld phones.

Smartphones can include one or more of the following features: the merging of a personal data/digital assistant (PDA) and a cellular phone; a keyboard interface (e.g., a QWERTY keyboard) configuration as either a touch screen or tactile keyboard; the capability to receive/download audio/video files. Furthermore, smartphones can: run an operating system software providing a standardized interface and platform for application developers; include advanced features like e-mail, Internet access and e-book reader capability; and/or (c) include a built-in full keyboard or external USB keyboard and VGA connector. In other words, a smartphone can be considered a miniature computer that has telephone capability. One example of a smartphone is the iPhone® product by Apple Inc. of Cupertino, Calif. Another example of a smartphone is the Blackberry® product by Research In Motion (RIM) of Waterloo, Ontario, Canada.

Following the introduction of smartphones, smartphone cases were introduced. Unfortunately, current smartphone cases have many shortcomings. For example, current smartphone cases do not provide the protection most sophisticated smartphones need. That is, current smartphone cases do not provide adequate protection from both major damage caused by, for example, dropping the smartphone and minor damage caused by, for example, scratches inflicted by day-to-day use. This requirement for protecting the smartphone from major damage is substantially different from protecting the smartphone from minor damage. Typically, a smartphone case will either primarily address protection from major damage, caused by dropping and the like or minor damage, caused by scratching. Cases that primarily address scratching protection tend to be manufactured from flexible materials and generally are designed not to scratch the mobile device. These cases are often called soft cases or enclosures. Unfortunately, protecting a mobile device from scratch damage can leave a customer with an unsatisfactory user experience because it does not protect the mobile device when dropped.

Alternatively, cases that primarily address major damage, such as dropping damage, tend to be manufactured from non-flexible, hard materials. These cases are often called hard cases or enclosures. However, smartphones can be difficult to remove from the hard cases and thus annoy the user. Additionally, both hard case and soft case designs can present difficulty for a user to access controls (e.g., buttons) on the side of the case, which is typically covered by the case/enclosure.

Therefore, a need exists in the art to develop a smartphone case or enclosure that will provide protection from both scratch and dropping damage, along with easy smartphone removal and access to control buttons.

BRIEF DESCRIPTION OF THE DRAWINGS

The invention will be better understood from a reading of the following detailed description of examples of embodiments, taken in conjunction with the accompanying figures in the drawings in which.

Figure 1:
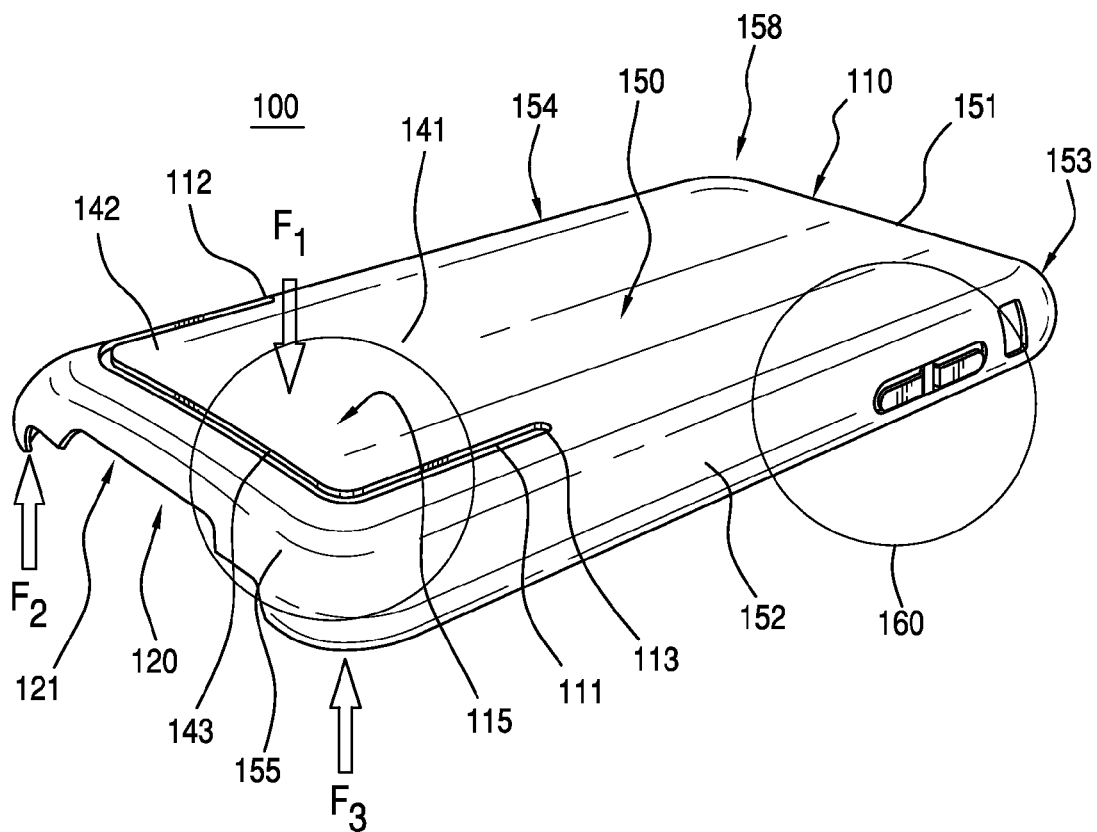
FIG. 1 is a perspective view illustrating an embodiment of an exemplary mobile media device case for providing protection of a mobile media device and allowing easier removal of the mobile media device from the mobile media device case, in accordance with the subject matter described herein.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

DETAILED DESCRIPTION

In some embodiments, a mobile media device enclosure can be configured to receive a mobile media device. The mobile media device enclosure can include: (a) a rigid portion, the rigid portion including a back wall and one or more sidewalls, the back wall and the one or more sidewalls defining an interior and an exterior of the mobile media device enclosure, the rigid portion configured to receive the mobile media device within the interior of the mobile media device enclosure; and (b) an ejection tab located at the back wall of the rigid portion, the ejection tab at least partially defined by a channel traversing from a first point in the rigid portion to a second point in the rigid portion, the ejection tab having a fixed portion and a moveable portion, the fixed portion of the ejection tab is mechanically coupled to the rigid portion, the movable portion of the ejection tab has a first portion mechanically coupled to the fixed portion of the ejection tab and a second portion at least partially defined by the channel. The movable portion of the ejection tab is configured to flexibly maintain a first position substantially parallel to an orientation of the back wall of the rigid portion, and the movable portion of the ejection tab is further configured to flexibly maintain a second position partially within the interior of the rigid portion when sufficient force is applied to the exterior of the rigid portion at the second portion of the movable portion of the ejection tab.

In further embodiments, a mobile media case system can be configured to enclose a mobile media device. The mobile media case system comprising a case having: (a) a rigid portion, the rigid portion of the case including a back wall and one or more sidewalls, the back wall and the one or more sidewalls defining an interior of the case and an exterior of the case, the rigid portion configured to enclose the mobile media device within the interior of the rigid portion; and (b) at least one protection tab, the at least one protection tab comprising a first portion substantially perpendicular to one of the one or more sidewalls and a second portion coupled to the first portion and the one of the one or more sidewalls, the second portion substantially parallel to the one of the one or more sidewalls. The one or more sidewalls have a user access area, and the user access area has an aperture. Each user access area is configured to provide user access to a portion of the mobile media device when the mobile media device is enclosed within the case. Each protection tab is associated with a user access area and mechanically coupled to the rigid portion. The at least one protection tab is further configured to overlie the aperture of the user access area of one of the one or more sidewalls.

In still further embodiments, a method of manufacturing a mobile media device enclosure can include: providing at least one machine tool for at least partially creating the mobile media device enclosure; manufacturing the mobile media device enclosure using the at least one machine tool such that the mobile media device enclosure includes: a rigid case portion, the rigid case portion including a back wall and one or more sidewalls, the back wall and the one or more sidewalls defining an interior of the mobile media device enclosure and an exterior of the mobile media device enclosure, the rigid portion configured to receive a mobile media device within the interior of the mobile media device enclosure; and an ejection tab located at the back wall of the rigid portion, the ejection tab at least partially defined by a channel traversing from a first point in the rigid portion to a second point in the rigid portion, the ejection tab having a fixed portion and a moveable portion, the fixed portion of the ejection tab mechanically coupled to the rigid portion, and the movable portion of the ejection tab having a first portion mechanically coupled to the fixed portion of the ejection tab and a second portion at least partially defined by the channel; and distributing the mobile media device enclosure.

Figure 12:
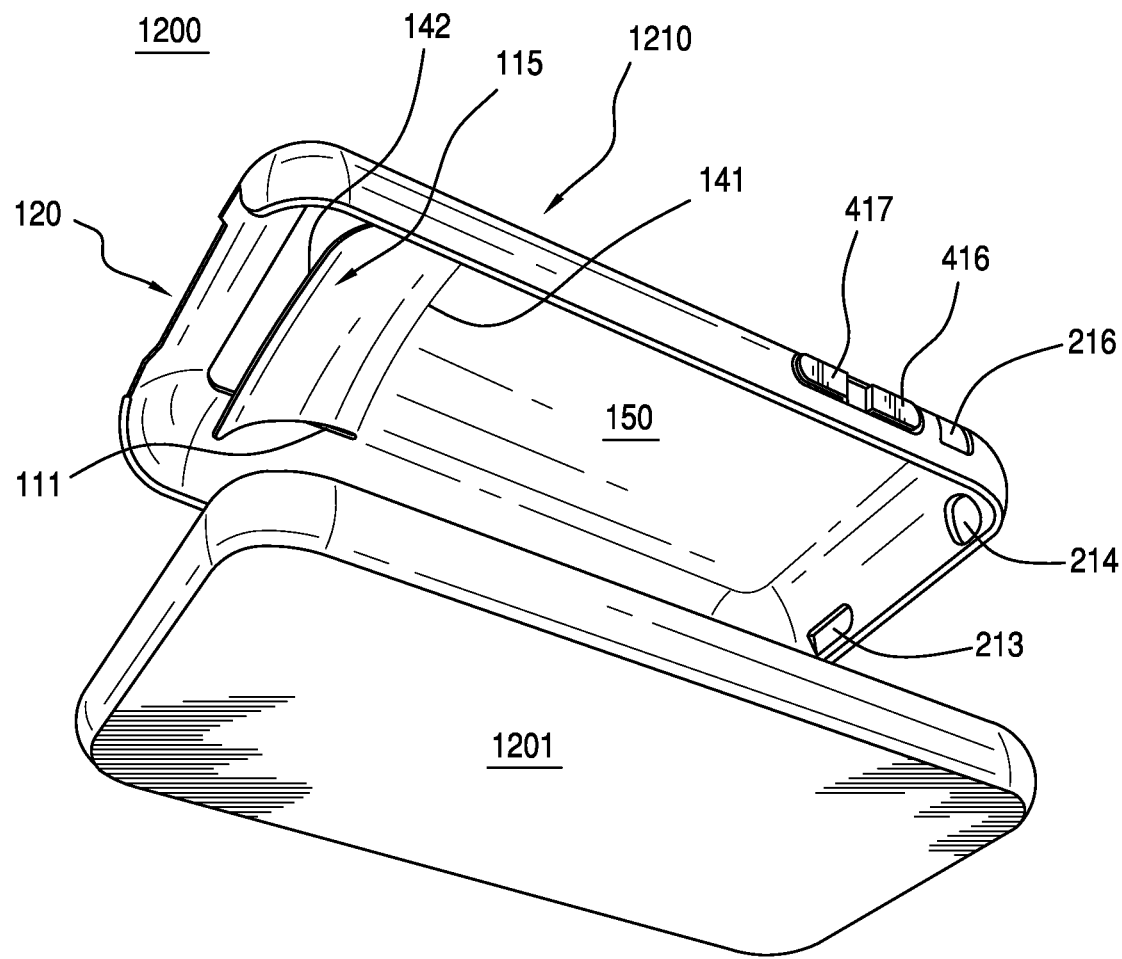
FIG. 12 illustrates a left, front three-quarter interior view of mobile media device case of FIG. 1 and a mobile media device, in accordance with the subject matter described herein.

FIG. 1 is a perspective view illustrating an embodiment of an exemplary mobile media device case 110 for providing protection of a mobile media device and allowing easier ejection of the mobile media device from mobile media device case 110. FIG. 1 includes mobile media case system 100 that includes mobile media device case 110 configured to receive a mobile media device 1201 (FIG. 12).

The term "mobile media device" should be broadly understood and includes electrical devices of all types and designs (e.g., smartphones, media players, telephones, audio-visual media players, and devices incorporating media players, telephones, and/or audio-visual devices). Examples of mobile media devices include smartphones, cellular (or mobile) telephones, laptop computers, audio playback devices, AM (amplitude modulated) and FM (frequency modulated) radios, CD (compact disk) players, and media (e.g., MP3 (MPEG Audio Layer-3)) players.

Figure 8:
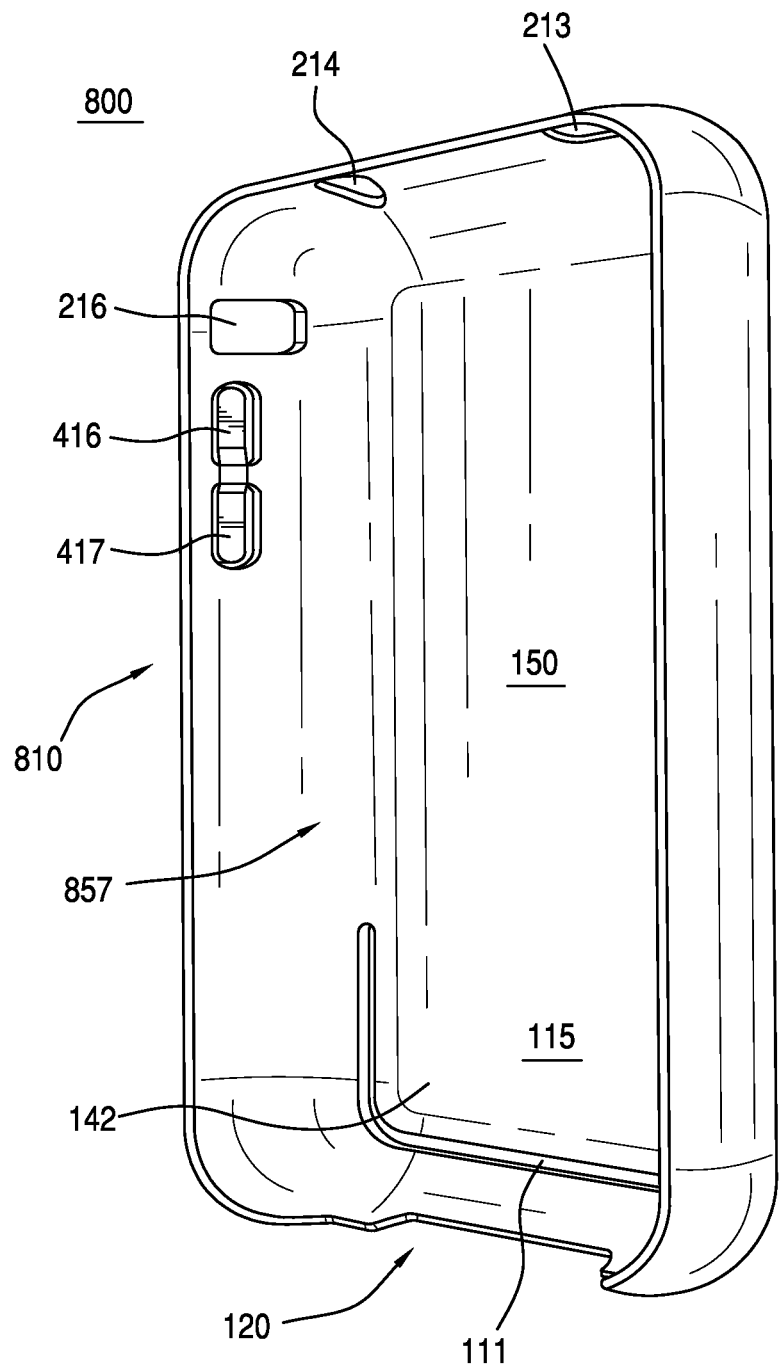
FIG. 8 is a right, front three-quarter interior view of mobile media device case of FIG. 1, in accordance with the subject matter described herein.

In some examples, mobile media device case 110 can include rigid case portion 150 having: (a) back wall 151; (b) one or more sidewalls 152, 153, 154, and 155. Back wall 151 and sidewalls 152, 153, 154, and 155 can define an interior 857 (FIG. 8) and an exterior 158 of the mobile media device case 110. Rigid case portion 150 can be configured to receive mobile media device 1201 (FIG. 12) within the interior 857 (FIG. 8).

Mobile media device case 110 also can include ejection tab 115. In some examples, ejection tab 115 can be located in back wall 151. For example, ejection tab 115 at least partially defined by a channel 111 traversing from first point 112 to second point 113.

In other embodiments, ejection tab 115 can be located in sidewall 152, 153, 154, or 155 or in a combination of back wall 151 and one or more of sidewalls 152, 153, 154 and 155. Mobile media device case 110 provides protection to a mobile media device encased within mobile media device case 110, while ejection tab 115 provides an improved method for removing the mobile media device from mobile media device case 110.

Mobile media device case 110 can additionally include hardware interface portion 120 and physical user input protection tabs 160. Hardware interface portion 120 can be located in sidewall 155, and physical user input protection tabs 160 can be located in sidewall 152. In other examples, hardware interface portion 120 can be located in back wall 151, and/or sidewalls 152, 153, or 154. In the same or different examples, physical user input protection tabs 160 can be located in back wall 151, and/or sidewalls 153, 154 or 155. Mobile media device case 110 can include elements not relevant to the present discussion.

In the illustrated embodiment, ejection tab 115 is integral with rigid case portion 150 such that ejection tab 115 and rigid case portion 150 have a unitary structure. Also in the illustrated embodiment, physical user input protection tabs 160 are integral with rigid case portion 150 such that physical user input protection tabs 160 and rigid case portion 150 have a unitary structure.

In a different embodiment, one or more of ejection tab 115 and physical user input protection tabs 160 can be separate from and/or separable from rigid case portion 150. Ejection tab 115 is further detailed below. Physical user input protection tabs 160 are also detailed below.

In some examples, hardware interface portion 120 is a defined area or portion of sidewall 155 and/or back wall 151 that has been removed from mobile media device case 110 to allow a mobile media device enclosed within mobile media device case 110 to connect to an exterior device, such as, for example, a computing device. That is, hardware interface portion 120 has a hole 121 in sidewall 155 and/or back wall 151.

Hardware interface portion 120 can be configured to facilitate the mechanical and electrical coupling of a hardware interface cable connector with a hardware interface dock connector of the mobile media device. In some embodiments, hardware interface portion 120 is configured as an area or portion removed from mobile media device case 110 to accommodate connecting the mobile media device enclosed within mobile media device case 110 to a proprietary or non-proprietary connector, such as, for example, a 30-pin connector designed to be used with an Apple® iPod® or iPhone® or iTouch® product. In another embodiment, hardware interface portion 120 is configured to accommodate connecting to the mobile media device using a USB (universal serial bus) connector. Hardware interface portion 120 is further detailed below.

Physical user input protection tabs 160 are located at one or more exemplary areas of rigid case portion 150 of mobile media device case 110, where each of such areas includes one or more portions of mobile media device case 110 that have been modified to allow user access to physical user inputs on the mobile media device 1201 (FIG. 12). In some embodiments, physical user input protection tabs 160 are implemented as protection tabs (detailed below) associated with each physical user input location that provide protection and input access to each associated physical user input location.

In an example, physical user input protection tabs 160 are implemented as protection tabs formed from material cut and modified from rigid case portion 150 and configured as one or more flat springy sheets, such as, in a leaf spring configuration. Furthermore, physical user input protection tabs 160 are configured such that each tab provides protection of the user input buttons located on the associated edges of the mobile media device enclosed within mobile media device case 110 below the tabs. In FIG. 1, physical user input protection tabs 160 are further configured such that each tab, when depressed, makes contact with the associated user input buttons located on the associated edges of the mobile media device. User input protection tab 160 can be sized such that a surface area of each of user input protection tabs 160 is less than the surface area of the holes in rigid case portion 150 in which user input protection tabs 160 are located.

Ejection tab 115 can be a portion of mobile media device case 110 and can include: (a) a fixed portion 141; and (b) a movable portion 142. Movable portion 142 is separated from bottom portion 143 by channel 111. Fixed portion 141 can be the portion of ejection tab 115 that can be coupled to rigid case portion 150 at back wall 151. Movable portion 142 can be mechanically coupled to fixed portion 141 and configured to rotate or move about the coupling point of fixed portion 141 and rigid case portion 150. Fixed portion 141 can be integral with movable portion 142 and back wall 151.

In some embodiments as illustrated in FIG. 1, ejection tab 115 is located within the bottom half of mobile media device case 110. In other embodiments, ejection tab 115 can be located within a different portion of mobile media device case 110, including the top half or the middle portion. Movable portion 142 can be implemented as a semi-rigid (if not rigid) member that is configured to flexibly rotate about the coupling point of fixed portion 141 and rigid case portion 150 when a user applies sufficient force to move movable portion 142 using one or more prescribed methodologies (See FIG. 10).

In some embodiments, channel 111 can at least partially define ejection tab 115. In various examples, channel 111 defines three sides of the movable portion of ejection tab 115 with the fourth side (e.g., fixed portion 141) coupled to rigid case portion 150. In such embodiments, channel 111 can form an angular "U" shape. In this example, movable portion 142 can have an angular U-shape.

In other embodiments, channel 111 defines only two sides of the movable portion of ejection tab 115, with the other side(s) defined by fixed portion ejection tab 115. In still other embodiments, channel 111 has a rounded or curved shape without distinct "sides." In the same or different embodiments, channel 111 has a curvilinear shape and movable portion 142 can include a single side with a curvilinear shape.

Movable portion 142 is configured to flexibly maintain a first position substantially parallel to the orientation of back wall 151. Movable portion 142 is further configured to flexibly maintain a second position partially within the interior of rigid case portion 150 when sufficient force is applied to the exterior of rigid case portion 150 at a second portion of movable portion 142. Ejection tab 115 can be further configured so that the movable portion 142 returns to its original position (e.g., the first position) when the force applied to movable portion 142 is reduced or removed.

That is, in operation, to remove mobile media device 1201 (FIG. 12) from mobile media device case 110, a user applies force in a first direction F1 within the area of ejection tab 115 while simultaneously applying additional force in a different direction at, for example, locations identified by F2 and/or F3. In these embodiments, the forces applied to the locations identified by F2 and F3 are each applied at different points on the exterior side of mobile media device case 110 proximate the corner or edges of mobile media device case 110 near hardware interface portion 120. In this embodiment, the direction of F2 and F3 are substantially opposite to direction F1. In one embodiment, the direction of F2 and F3 are substantially parallel to each other or are otherwise in similar directions as illustrated in FIG. 1. When force F1 is applied, mobile media device 1201 (FIG. 12) is pushed out of mobile media device case 110 through the open or front side of mobile media device case 110.

Mobile media device case 110 can be at least partially manufactured from any suitable material that is at least semi-rigid, including polycarbonate. As used herein, in some examples, rigid can mean rigid or semi-rigid. In some embodiments, the thickness of ejection tab 115 and, in particular, the movable portion of ejection tab 115 is the same as the thickness of the remaining portions of mobile media device case 110. In other embodiments, the thickness of ejection tab 115, or at least fixed portion 141 of ejection tab 115, is less than the thickness other portions of mobile media device case 110 to facilitate the movement of ejection tab 115.

Figure 2:
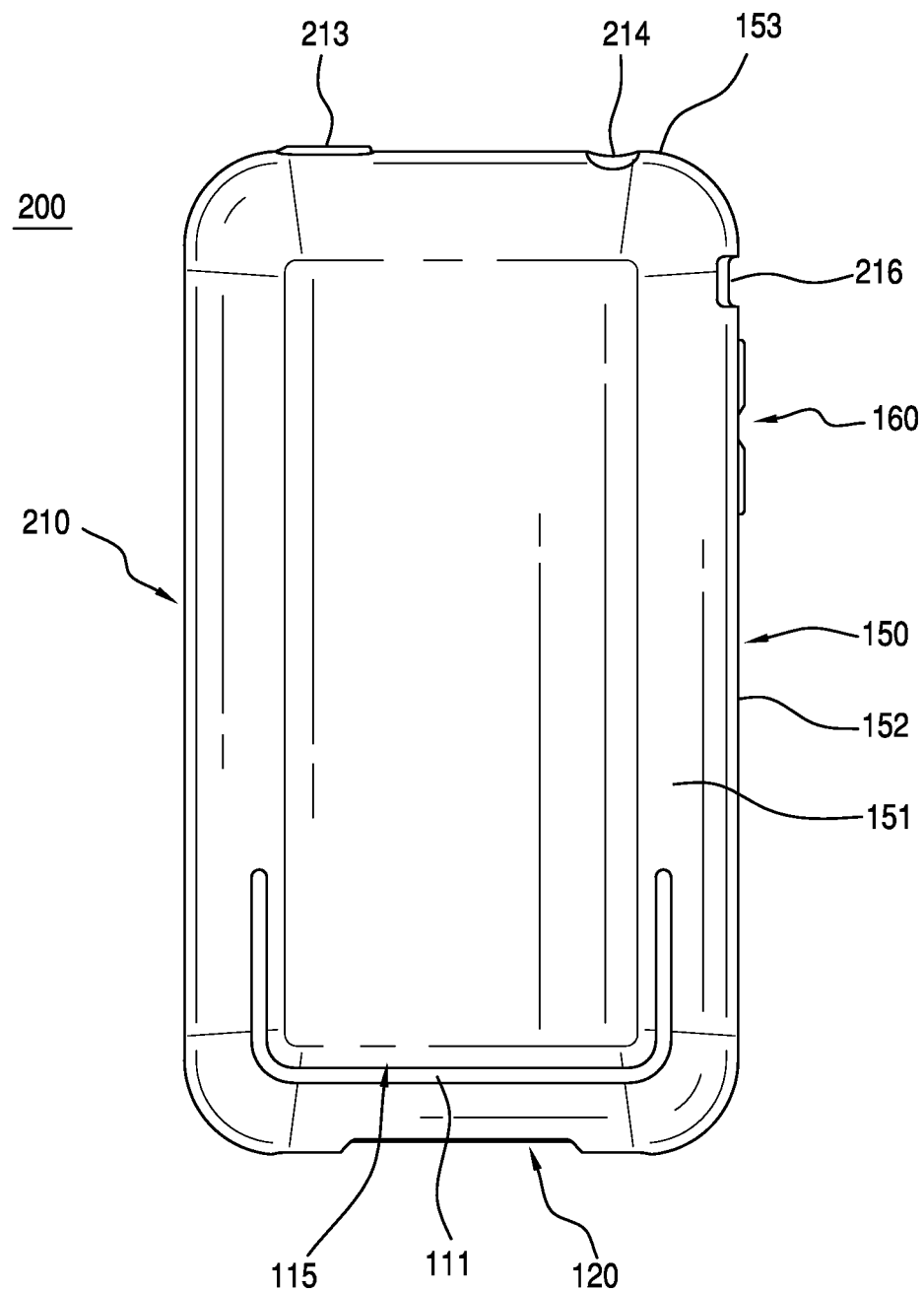
FIG. 2 is a rear view illustrating the mobile media device case of FIG. 1, in accordance with the subject matter described herein.

FIG. 2 is a rear view illustrating the mobile media device case of FIG. 1 including a movable portion of an ejection tab. FIG. 2 shows a mobile media case system 200 that includes mobile media device case 210. In FIG. 2, mobile media device case 210 includes rigid case portion 150 and ejection tab 115. Mobile media device case 110 additionally includes channel 111 that defines ejection tab 115. In FIG. 2, mobile media device case 210 additionally includes hardware interface portion 120, physical user input protection tabs 160, protection tab 213, access area 214 and access area 216. Elements similarly numbered with the last two significant digits and described in FIG. 1 function in a substantially similarly way. In FIG. 2, mobile media device case 210 may include elements not relevant to the present discussion.

In some embodiments, protection tab 213 can be located at sidewall 153. Protection tab 213 can provide protection and user access to the main power control of a mobile media device 1201 (FIG. 12) encased or enclosed within mobile media device case 210. Protection tab 213 is further detailed below. In the same or different embodiment, access area 214 can also be located at sidewall 153. Access area 214 can provide user access to an auxiliary connector, such as, for example an auxiliary input connector, or an auxiliary output connector of a mobile media device encased or enclosed within mobile media device case 110. In the example illustrated in FIG. 2, access area 214 can provide user access to an auxiliary output connector, such as a 3.5 mm speaker/input dual use connector. Similarly, access area 216 can be located at sidewall 152 and can provide user access to a user activated switch, such as, for example a user activated "mute" switch to mute or un-mute a mobile media device encased or enclosed within mobile media device case 110.

Protection tab 213 is located on a portion of rigid case portion 150 of mobile media device case 110 that has been modified to allow user access to physical user inputs on the mobile media device (not shown). In some embodiments, protection tab 213 is implemented as a protection tab (further detailed below) at a physical user input location. Protection tab 213 can provide protection and input access at the associated physical user input location.

In an example, protection tab 213 can be implemented as a protection tab formed from material cut and modified from rigid case portion 150 and configured as a flat springy sheet, (e.g., a leaf spring configuration). Furthermore, protection tab 213 can be configured such that the tab provides protection of the user input button located on the associated edge of the enclosed mobile media device. Protection tab 213 can be further configured such that the tab, when depressed, makes contact with the associated user input button located on the associated edge of the mobile media device.

Protection tab 213 can be associated with a user access area and mechanically coupled to rigid case portion 150. In some examples, protection tab 213 can include a first portion substantially perpendicular to sidewall 153 and a second portion coupled to the first portion and configured substantially parallel to the surface of sidewall 153. Protection tab 213 can be further configured to overlie a hole in the user access area of sidewall 153.

Figure 3:
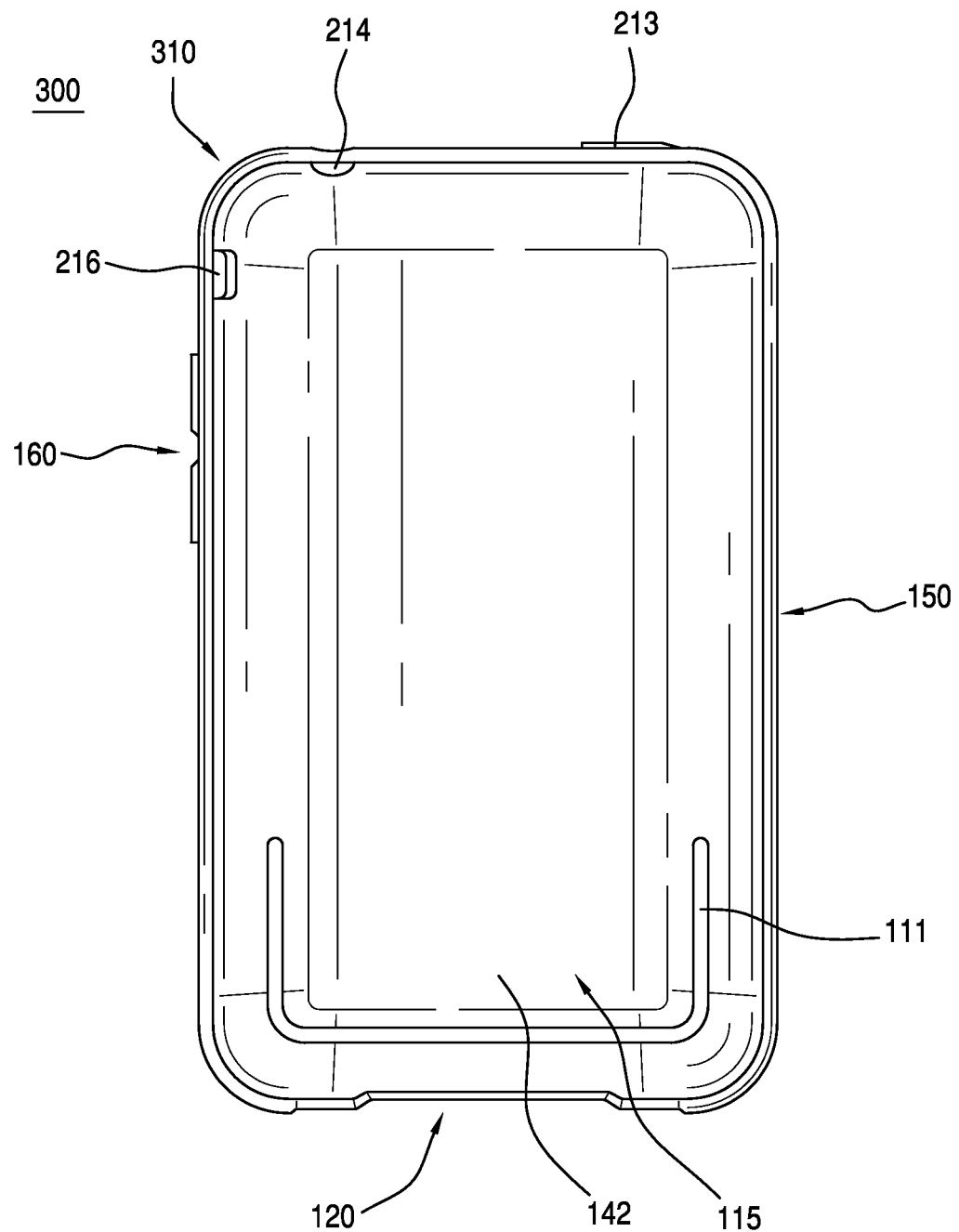
FIG. 3 is a front view illustrating the mobile media device case of FIG. 1, in accordance with the subject matter described herein.

FIG. 3 is a front view illustrating the mobile media device case 310 including movable portion 142 of ejection tab 115. FIG. 3 shows a mobile media case system 300 that includes mobile media device case 310. As shown in FIG. 3, mobile media device case 310 includes rigid case portion 150 and ejection tab 115. Mobile media device case 310 additionally includes channel 111 that at least partially defines ejection tab 115. In FIG. 3, mobile media device case 310 additionally includes hardware interface portion 120, physical user input protection tabs 160, protection tab 213, access area 214 and access area 216. Elements similarly numbered with the last two significant digits and described in FIGS. 1 and 2 function in a substantially similarly way. In FIG. 3, mobile media device case 310 may include elements not relevant to the present discussion.

Figure 4:
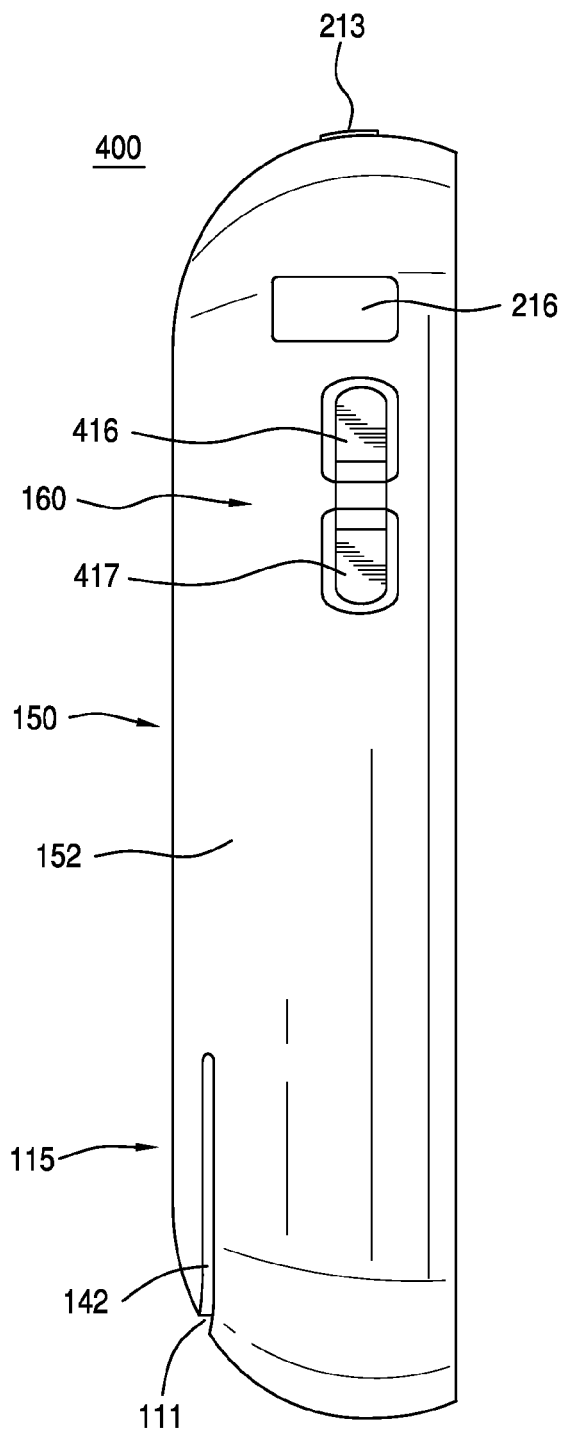
FIG. 4 is a first side view illustrating the mobile media device case of FIG. 1, in accordance with the subject matter described herein.

FIG. 4 is a first side view illustrating sidewall 152 of mobile media device case 410. FIG. 4 illustrates a right-side view of mobile media device case 110 of FIG. 1. FIG. 4 shows a mobile media case system 400 that includes mobile media device case 410. In FIG. 4, mobile media device case 410 includes rigid case portion 150 and ejection tab 115. Mobile media device case 410 additionally includes channel 111 that at least partially defines ejection tab 115. In FIG. 4, mobile media device case 410 additionally includes physical user input protection tabs 160 and protection tab 213. Physical user input protection tabs 160 additionally includes protection tab 416 and protection tab 417. Elements similarly numbered with the last two significant digits and described in FIGS. 1-3 function in a substantially similarly way. In FIG. 4, mobile media device case 410 may include elements not relevant to the present discussion.

As described in relation to FIG. 2 above, protection tab 416 and protection tab 417 are located at one or more exemplary areas of rigid case portion 150 of mobile media device case 110, where each of such areas includes one or more portions of mobile media device case 110 that have been modified to allow user access to physical user inputs on the mobile media device (not shown). In some embodiments, protection tab 416 and protection tab 417 are implemented as protection tabs associated with physical user input locations that provide protection and input access to each of the associated physical user input locations.

In an example, protection tab 416 and protection tab 417 are implemented as protection tabs formed from material cut and modified from rigid case portion 150 and configured as one or more flat springy sheets, (e.g., a leaf spring configuration). In one embodiment, protection tabs 416 and 417 provide protection and user access to user interface controls of a mobile media device encased within mobile media device case 410. Further to the example, protection tab 416 and protection tab 417 are configured such that each tab provides protection of the user input buttons (e.g., volume up and volume down controls) located on the associated edges of the mobile media device. In some embodiments, protection tabs 416 and 417 provide protection and user access to "up" and "down" user interface controls of an iPhone® device encased within mobile media device case 410. In FIG. 4, protection tab 416 and protection tab 417 are further configured such that each tab, when depressed, makes contact with the associated user input button located on the associated edges of the mobile media device.

Figure 5:
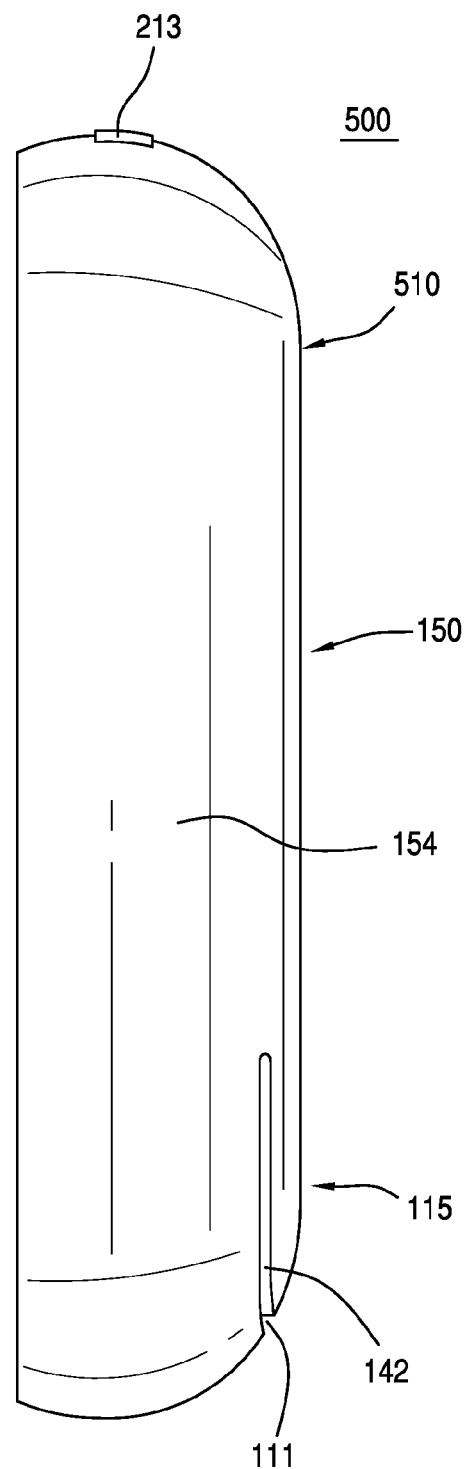
FIG. 5 is a second side view illustrating the mobile media device case of FIG. 1, in accordance with the subject matter described herein.

FIG. 5 is a second side view illustrating side 154 of mobile media device case 510. FIG. 5 illustrates a left-side view of mobile media device case 110 of FIG. 1. FIG. 5 shows a mobile media case system 500 that includes mobile media device case 510. In FIG. 5, mobile media device case 510 includes rigid case portion 150 and ejection tab 115. Mobile media device case 510 additionally includes channel 111 that at least partially defines ejection tab 115. Mobile media device case 510 further includes protection tab 213. Elements similarly numbered with the last two significant digits and described in FIGS. 1-4 function in a substantially similarly way. In FIG. 5, mobile media device case 510 may include elements not relevant to the present discussion.

Figure 6:
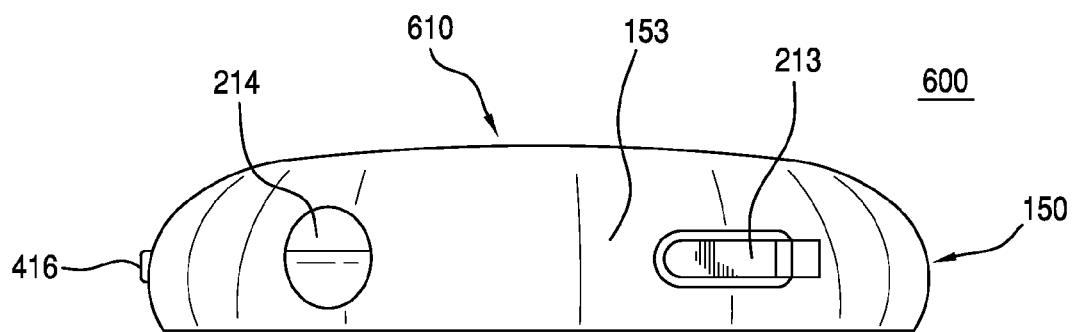
FIG. 6 is a top view illustrating the mobile media device case of FIG. 1, in accordance with the subject matter described herein.

FIG. 6 is a top view illustrating sidewall 153 of mobile media device case 610 with the front face and interior of mobile media device case 610 facing downwards. FIG. 6 shows a mobile media case system 600 that includes mobile media device case 610. In FIG. 6, mobile media device case 610 includes rigid case portion 150 and an ejection tab (not shown in FIG. 6). Mobile media device case 610 additionally includes protection tab 213, access area 214, and protection tab 416. Elements similarly numbered with the last two significant digits and described in FIGS. 1-5 function in a substantially similarly way. In FIG. 6, mobile media device case 610 may include elements not relevant to the present discussion.

Figure 7:
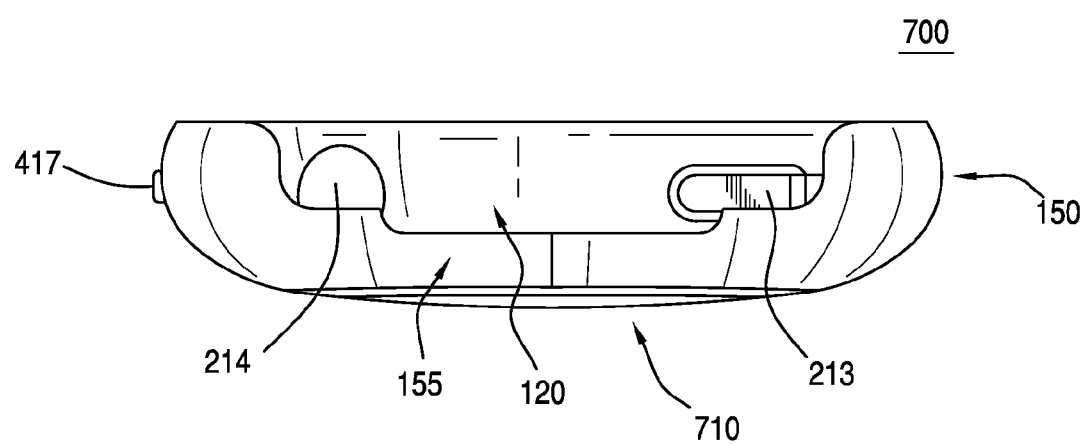
FIG. 7 is a bottom view illustrating the mobile media device case of FIG. 1, in accordance with the subject matter described herein.

FIG. 7 is a bottom view illustrating sidewall 155 of mobile media device case 710 with the front face and interior of mobile media device case 710 facing upwards. FIG. 7 shows a mobile media case system 700 that includes mobile media device case 710. In FIG. 7, mobile media device case 710 includes rigid case portion 150 and an ejection tab (not shown in FIG. 7). Mobile media device case 710 additionally includes hardware interface portion 120, protection tab 213, access area 214, and protection tab 416. Elements similarly numbered with the last two significant digits and described in FIGS. 1-6 function in a substantially similarly way. In FIG. 7, mobile media device case 710 may include elements not relevant to the present discussion.

FIG. 8 is a right, front three-quarter interior view illustrating an interior 857 of mobile media device case 810. FIG. 8 shows a mobile media case system 800 that includes mobile media device case 810. In FIG. 8, mobile media device case 810 includes rigid case portion 150 and ejection tab 115. Mobile media device case 810 additionally includes channel 111 that at least partially defines ejection tab 115. In FIG. 8, mobile media device case 810 additionally includes hardware interface portion 120, protection tab 213, access area 214, access area 216, and protection tabs 416 and 417. Elements similarly numbered with the last two significant digits and described in FIGS. 1-7 function in a substantially similarly way. In FIG. 8, mobile media device case 810 may include elements not relevant to the present discussion.

In one embodiment, interior 857 of mobile media device case 810 includes a softer material than the exterior portion of mobile media device case 810 to prevent mobile media device case 810 from scratching the rear surface of the enclosed mobile media device 1201 (FIG. 12). For example, the interior portion of mobile media device case 810 can include a urethane or other rubber layer or coating over the polycarbonate or other semi-rigid or rigid material used for the exterior portion. As another example, the interior portion can include a microfiber, linen, satin, or other fabric interior. In a different embodiment, only the interior portion of ejection tab 115 or movable portion 142 has the softer material.

Figure 9:
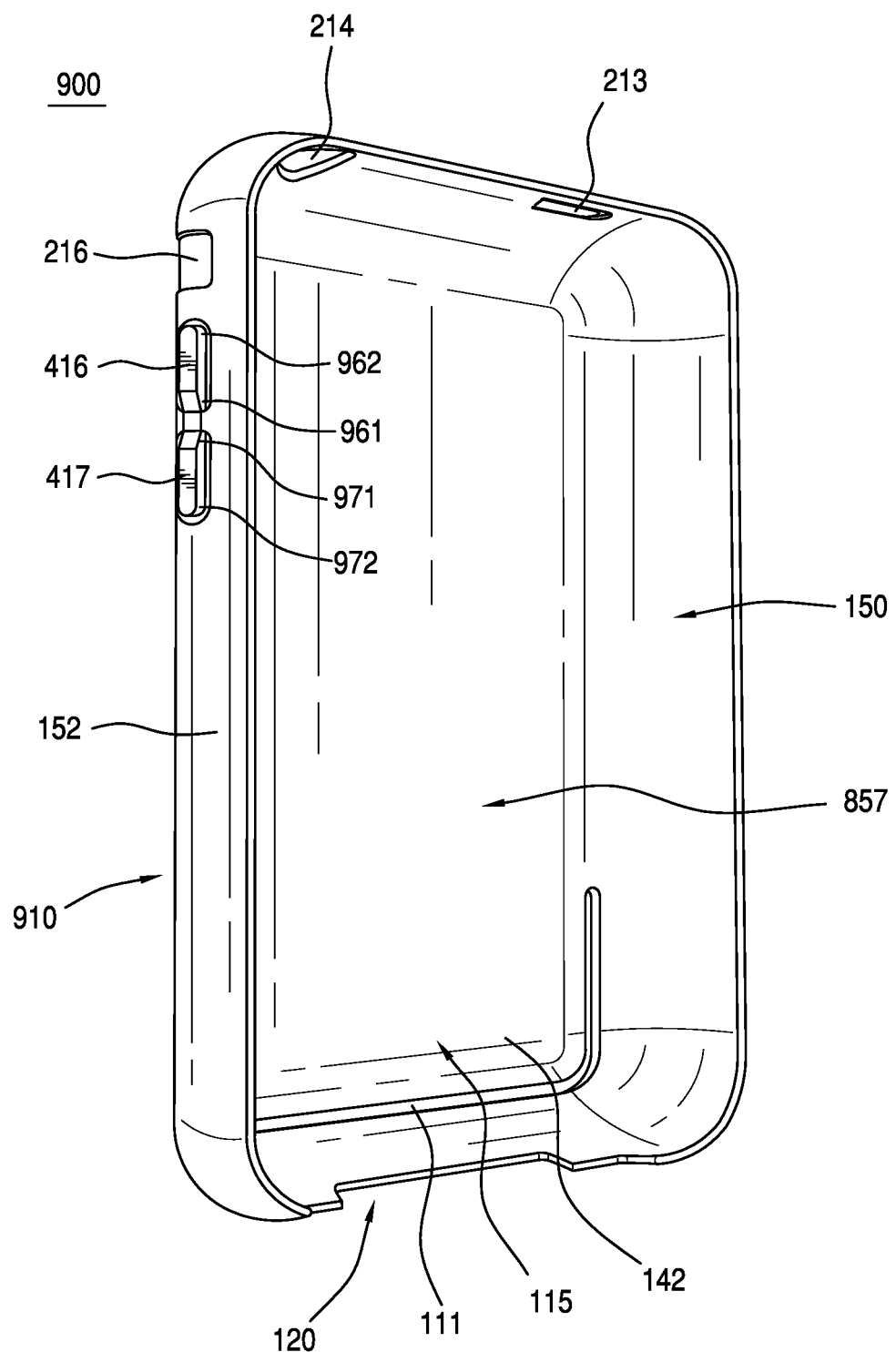
FIG. 9 is a left, front three-quarter interior view illustrating the mobile media device case of FIG. 1, in accordance with the subject matter described herein.

FIG. 9 is a left, front three-quarter interior view illustrating interior 857 of mobile media device case 910. FIG. 9 shows a mobile media case system 900 that includes mobile media device case 910. In FIG. 9, mobile media device case 910 includes rigid case portion 150 and ejection tab 115. Mobile media device case 910 additionally includes channel 111 that at least partially defines ejection tab 115. In FIG. 9, mobile media device case 910 additionally includes hardware interface portion 120, protection tab 213, access area 214, access area 216, and protection tabs 416 and 417. Elements similarly numbered with the last two significant digits and described in FIGS. 1-8 function in a substantially similarly way. In FIG. 9, mobile media device case 910 may include elements not relevant to the present discussion.

In FIG. 9, protection tab 416 includes first tab portion 961 and second tab portion 962, and protection tab 417 includes first tab portion 971 and second tab portion 972. In the embodiment shown in FIG. 9, protection tab 213 also includes first and second portions, but such portions are not labeled. In some embodiments, first tab portion 961 of protection tab 416 and first tab portion 971 of protection tab 417 (as well as the first tab portion of protection tab 213) are configured to be movable in physical communication with mobile media device case 910. In these embodiments, second tab portion 962 of protection tab 416 and second tab portion 972 of protection tab 417 (as well as the second tab portion of protection tab 213) have dimensions substantially similar to the associated removed portions or holes of media device case 910.

As illustrated in FIG. 9, first tab portion 961 of protection tab 416 and first tab portion 971 of protection tab 417 (as well as the first tab portion of protection tab 213) are configured to protrude outwardly from mobile media device case 910. When in use, they are configured (e.g., bent) to lie substantially parallel to and at a predetermined distance or gap from the associated removed portions of media device case 910.

Additionally, second tab portion 962 of protection tab 416 and second tab portion 972 of protection tab 417 (as well as the second tab portion of protection tab 213) generally follow and substantially cover at a predetermined distance or gap from the associated removed portion (i.e., hole) of media device case 910.

First tab portion 961 of protection tab 416 and first tab portion 971 of protection tab 417 (as well as the first tab portion of protection tab 213) can be substantially analogous in functionality to ejection tab 115, except that first tab portion 961 of protection tab 416 and first tab portion 971 of protection tab 417 (as well as the first tab portion of protection tab 213) are not flush with the surface of mobile media device case 910. Similarly, second tab portion 962 of protection tab 416 and second tab portion 972 of protection tab 417 (as well as the second tab portion of protection tab 213) can function analogously to fixed portion of ejection tab 115. First tab portion 961 and/or second tab portion 962 of protection tab 416 and first tab portion 971 and/or second tab portion 972 of protection tab 417 (as well as the second tab portion of protection tab 213) can be positioned in a substantially curved manner (e.g. bent) when in a bent/stressed state.

In operation, each of protection tabs 213, 416 and 417 can be located usually in one of two positions. In one embodiment, the second tab portion 962 and second tab portion 972 (as well as the second tab portion of protection tab 213) are not in contact with an associated physical user input in the first position. In an example of this first position, second tab portion 962 and second tab portion 972 (as well as the second tab portion of protection tab 213) are located a predetermined distance from the associated physical user input of a mobile media device enclosed within mobile media device case 910. The first position can also be referred to as the relaxed position. In some examples, first tab portions 961 and 971 are substantially perpendicular to sidewall 152 when in the relaxed state. In some examples, second tab portions 962 and 972 are substantially parallel to sidewall 152 when in the relaxed state.

In a same or different embodiment, the second position provides for the second tab portion 962 and second tab portion 972 (as well as the second tab portion of protection tab 213) can be in contact with an associated physical user input. The second tab portions can be placed in the second positions, when a user applies sufficient force to second tab portion 962 and second tab portion 972 (as well as the second tab portion or protection tab 213) to put the second tab portions in contact with an associated physical user input. The second position can be referred to as the stressed position, and in the second position, first tab portion 961 and first tab portion 971 (as well as the first tab portion of protection tab 213) can be bent or stressed while the second tab portion 962 and second tab portion 972 (as well as the second tab portion of protection tab 213) can be relaxed or bent/stressed.

Protection tabs 213, 416 and 417 can be formed simultaneously with media device case 910 during the manufacturing process. In another embodiment, protection tabs 213, 416 and 417 are manufactured separately from the same or different materials and mechanically coupled to media device case 910. In a further embodiment, mobile media device case 910 does not include one or more of protection tabs 213, 416, and 417 and, instead, has one or more holes where protection tabs 213, 416, and/or 417 would otherwise be located to allow access to the physical user input.

Figure 10:
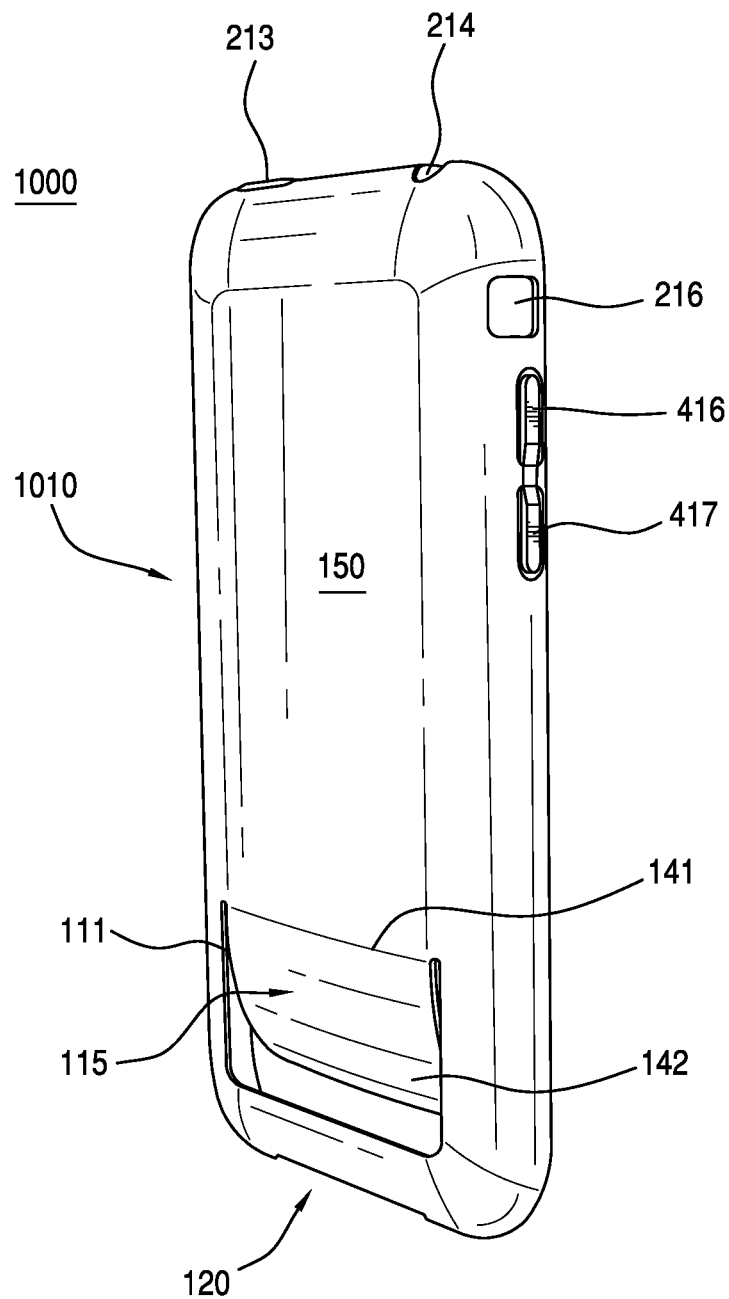
FIG. 10 is a left, rear three-quarter exterior view illustrating the mobile media device case of FIG. 1, in accordance with the subject matter described herein.

FIG. 10 is a left-rear three-quarter exterior view illustrating the mobile media device case of FIG. 1 including the movable portion 142 of the ejection tab 115 in a device ejection position. FIG. 10 shows a mobile media case system 1000 that includes mobile media device case 1010. In FIG. 10, mobile media device case 1010 includes rigid case portion 150 and ejection tab 115. Mobile media device case 1010 additionally includes channel 111 that at least partially defines ejection tab 115. In FIG. 10, mobile media device case 1010 additionally includes hardware interface portion 120, protection tab 213, access area 214, access area 216, and protection tabs 416 and 417. Elements similarly numbered with the last two significant digits and described in FIGS. 1-9 function in a substantially similarly way. In FIG. 10, mobile media device case 1010 may include elements not relevant to the present discussion.

In FIG. 10 and as explained previously, ejection tab 115 includes a fixed portion 141 and a movable portion 142 that can be a semi-rigid (or rigid) member configured to flexibly rotate about fixed portion when a user applies sufficient force to the movable portion 142 using one or more methods. In this embodiment, when sufficient force is applied to the movable portion 142, ejection tab 115 will move about fixed portion 141 and displace a mobile media device 1201 (FIG. 12) from within media device case 1010. In FIG. 10, ejection tab 115 is shown to be rotated, moved, or deformed while a sufficient force is applied to the movable portion of ejection tab 115. The configuration of media device case 1010 permits the removal of a media device 1201 (FIG. 12) from media device case 1010.

Figure 11:
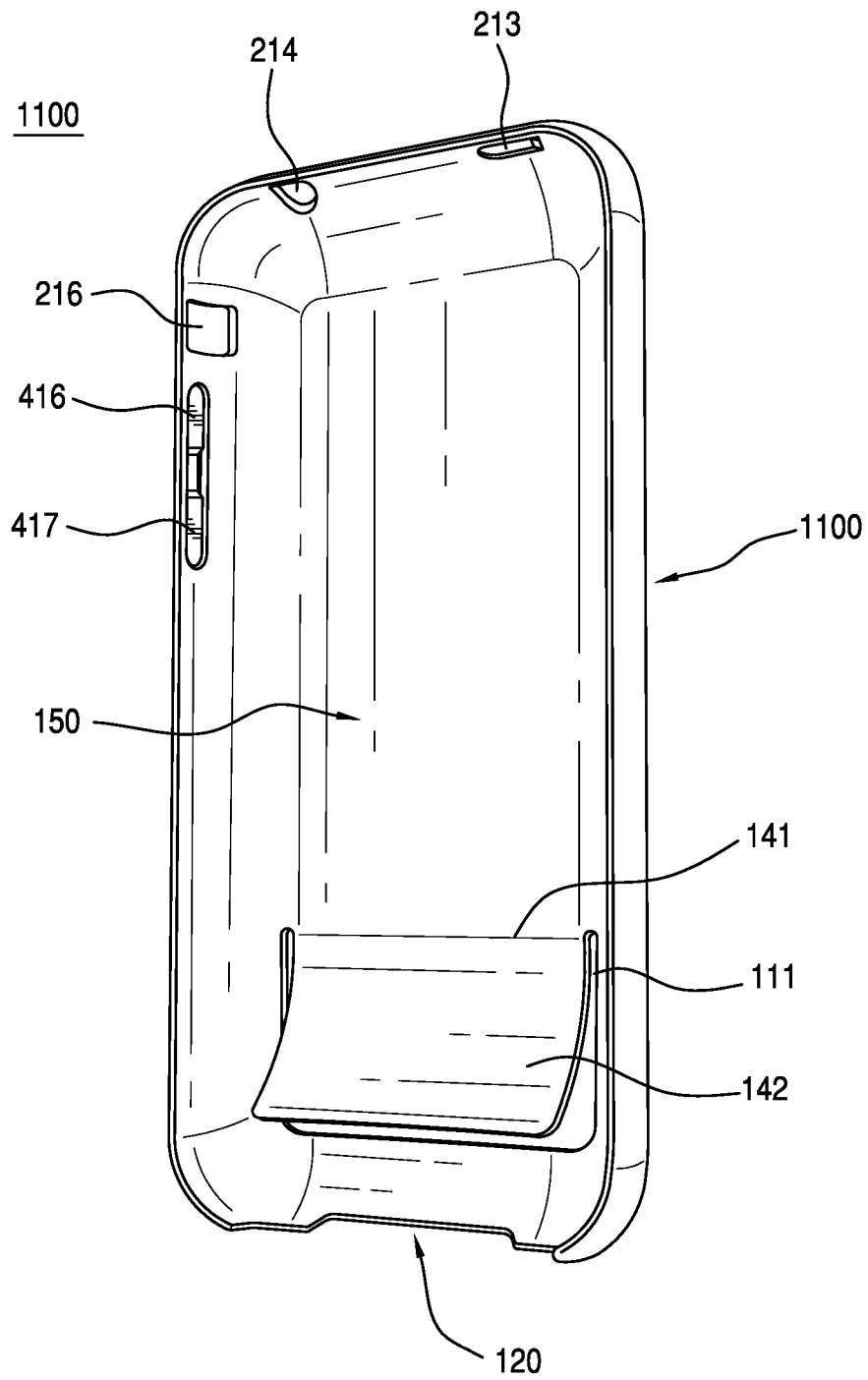
FIG. 11 is a right, front three-quarter interior view illustrating the mobile media device case of FIG. 1, in accordance with the subject matter described herein.

FIG. 11 is a right-front three-quarter interior view illustrating the mobile media device case 1110 including the movable portion 142 of the ejection tab 115 in a device ejection position. FIG. 11 shows a mobile media case system 1100 that includes mobile media device case 1110. In FIG. 11, mobile media device case 1110 includes rigid case portion 150 and ejection tab 115. Mobile media device case 1110 additionally includes channel 111 that at least partially defines ejection tab 115. In FIG. 11, mobile media device case 1110 additionally includes hardware interface portion 120, protection tab 213, access area 214, access area 216, and protection tabs 416 and 417. Elements similarly numbered with the last two significant digits and described in FIGS. 1-10 function in a substantially similarly way. In FIG. 11, mobile media device case 1110 may include elements not relevant to the present discussion. Similar to FIG. 10, FIG. 11 shows ejection tab 115 in a rotated, moved, or deformed state.

FIG. 12 illustrates a left-front three-quarter interior view of mobile media device case 1210 and a mobile media device 1201. FIG. 12 shows a mobile media case system 1200 that includes mobile media device case 1210 and a mobile media device 1201. In FIG. 12, mobile media device case 1210 includes rigid case portion 150 and ejection tab 115 that can be physically part of mobile media device case 1210. Mobile media device case 1210 additionally includes channel 111 that at least partially defines ejection tab 115. In FIG. 12, mobile media device case 1210 additionally includes hardware interface portion 120, protection tab 213, access area 214, access area 216, and protection tabs 416 and 417. Elements similarly numbered with the last two significant digits and described in FIGS. 1-11 function in a substantially similarly way. In FIG. 12, mobile media device case 1210 may include elements not relevant to the present discussion.

In FIG. 12, mobile media case system 1200 illustrates one embodiment of mobile media device case 1210 and mobile media device 1201 in operation where mobile media device 1201 has just been removed or ejected from mobile media device case 1210. As illustrated in FIG. 12, mobile media device 1201 includes a rear surface facing towards the front and interior of mobile media device case 1210, and mobile media device 1201 includes a front surface facing away from mobile media device case 1210. In FIG. 12, when sufficient force is applied to ejection tab 115 of mobile media device 1201, movable portion 142 of ejection tab 115 will rotate or move about fixed portion 141 of ejection tab 115 and displace mobile media device 1201 from within mobile media device case 1210.

Figure 13:
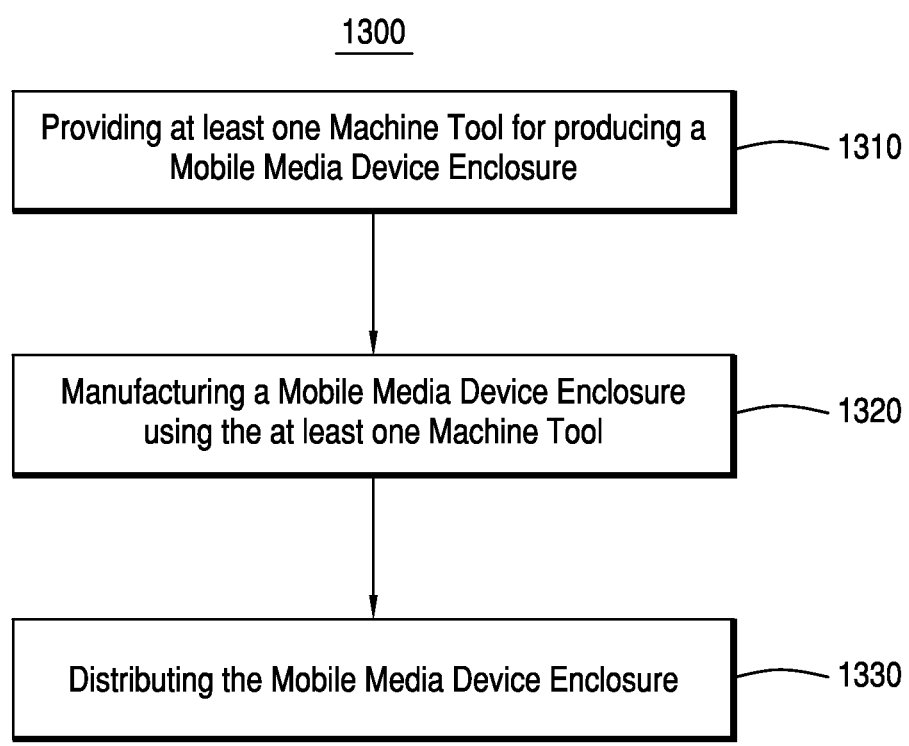
FIG. 13 illustrates a flow chart of a method of manufacturing a mobile media device enclosure, in accordance with the subject matter described herein.

FIG. 13 illustrates an example of a method 1300 of manufacturing a portable device according to embodiments. In some embodiments, the activities of the method 1300 described in the flow chart of FIG. 13 can be performed in the order presented. In other embodiments, the activities of the method 1300 described in the flow chart of FIG. 13 can be performed in any other suitable order. In still other embodiments, one or more of the activities of the method 1300 described in the flow chart of FIG. 13 can be combined.

Method 1300 of FIG. 13 includes an activity 1310 of providing at least one machine tool for producing a mobile media device enclosure. In some embodiments, the at least one machine tool is configured to produce a mobile media device enclosure having a rigid case portion and an ejection tab that is at least partially defined by a channel. In an example and referring to FIG. 1 above, the at least one machine tool is configured to produce mobile media device case 110 having rigid case portion 150 and ejection tab 115 defined by a channel 111. In this example, the channel defines three sides (e.g., With an angular "U" shape) of the ejection tab with the fourth side (e.g., the fixed portion) coupled to the rigid case portion of the mobile media device case. In other examples, the channel defines two sides of the movable portion of the ejection tab, with the other side(s) forming the fixed portion of the ejection tab and being coupled to the rigid case portion of the mobile media device case.

In the same or different embodiments, the at least one machine tool is configured to produce a mobile media device enclosure having one or more user input protection tabs. In these embodiments, the at least one machine tool is configured to remove a portion of material from a rigid case portion of the mobile media device case during the manufacturing step of activity 1320. Further to these embodiments, the at least one machine tool is configured so that material removed from the rigid case portion can include a portion that remains coupled to the rigid case portion of the mobile media device case. In these embodiments, the at least one machine tool is configured so that the portion that remains coupled to the rigid case portion of the mobile media device case is configured outwardly from the mobile media device case and, then, are further configured (e.g., bent) to lie substantially parallel to and at a predetermined distance from the associated openings within the media device case.

In an example and referring to FIG. 9 above, the at least one machine tool is configured to produce mobile media device case 910 having protection tabs 416 and 417. In this example, the at least one machine tool is configured to remove a portion of material from rigid case portion 150 of mobile media device case 910 during the manufacturing process of activity 1320. In this example, the at least one machine tool is configured so that first tab portion 961 remains coupled to rigid case portion 150 of the mobile media device case 910. In this embodiment, the at least one machine tool is configured so that first tab portion 961 is configured outwardly from mobile media device case 910 and, then, is further configured (e.g., bent) to include a second tab portion 962 that lays substantially parallel to and at a predetermined distance from the associated openings within media device case 910.

Method 1300 in FIG. 13 continues with an activity 1320 of manufacturing a mobile media device enclosure using the at least one machine tool. In some embodiments, the at least one machine tool can include a machine tool that can injection mold a portable media device enclosure. As an example, the injection mold process can use polycarbonate or another material that can be hardened or made rigid or semi-rigid to create the portable media device enclosure. The at least one machine tool can also include machine tools to produce an ejection tab and/or one or more protection tabs. After removing the media device enclosure from the at least one machine tool, a softer material can be applied to one or more interior portions of the media device enclosure.

Method 1300 in FIG. 13 continues with an activity 1330 distributing the mobile media device enclosure. In some embodiments, distributing the mobile media device enclosure includes packaging and shipping one or more packaged mobile media device enclosures through a distribution channel. In other embodiments, distributing the mobile media device enclosure includes selling and shipping one or more mobile media device enclosures through a distribution channel.

Although aspects of the subject matter described herein have been described with reference to specific embodiments, it will be understood by those skilled in the art that various changes may be made without departing from the scope of the subject matter described herein. Accordingly, the disclosure of embodiments is intended to be illustrative of the scope of the subject matter described herein and is not intended to be limiting. It is intended that the scope of the subject matter described herein shall be limited only to the extent required by the appended claims. To one of ordinary skill in the art, it will be readily apparent that the devices and method discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the subject matter described herein and claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A mobile communications device enclosure configured to receive a mobile communications device, the mobile communications device enclosure comprising:
   a rigid portion, the rigid portion including a back wall and one or more sidewalls, the back wall and the one or more sidewalls defining an interior and an exterior of the mobile communications device enclosure, the rigid portion configured to receive the mobile communications device within the interior of the mobile communications device enclosure;
   at least one protection tab, each protection tab of the at least one protection tab includes a first portion substantially perpendicular to one of the one or more sidewalls and a second portion coupled to the first portion of such protection tab and configured substantially parallel to a surface of the one of the one or more sidewalls; and
   an ejection tab located at the back wall of the rigid portion, the ejection tab at least partially defined by a channel traversing from a first position in the rigid portion to a second position in the rigid portion, the ejection tab having a fixed portion and a movable portion, the fixed portion of the ejection tab is mechanically coupled to the rigid portion, the movable portion of the ejection tab has a first portion mechanically coupled to the fixed portion of the ejection tab and a second portion at least partially defined by the channel, wherein:

the movable portion of the ejection tab is configured to flexibly maintain substantially parallel to an orientation of the back wall of the rigid portion and substantially coplanar with the back wall of the rigid portion, the movable portion of the ejection tab further configured to shift partially within the interior of the rigid portion while sufficient force is applied to the exterior of the second portion of the movable portion of the ejection tab;

the ejection tab covers at least a portion of a rear surface of the mobile communications device when the interior of the mobile communications device enclosure receives the mobile communications device, the rear surface of the mobile communications device is opposite a screen of the mobile communications device;

the ejection tab has a substantially flat interior surface;

the ejection tab has a substantially flat exterior surface;

the one or more sidewalls include one or more user access areas;

the one or more user access areas having one or more holes;

the one or more user access areas are configured to provide user access to one or more portions of the mobile communications device;

each protection tab of the at least one protection tab is associated with a different one of the one or more user access areas and mechanically coupled to the rigid portion; and the at least one protection tab is further configured to overlie the one or more holes of the one or more user access areas of the one of the one or more sidewalls.

2. The mobile communications device enclosure of claim 1, wherein the at least one protection tab is sized such that a surface area of each protection tab of the at least one protection tab is less than a surface area of a corresponding one of the one or more holes of the one or more user access areas of the one or more sidewalls.

3. The mobile media communications device enclosure of claim 1, wherein:

the second portion of each protection tab of the at least one protection tab is configured to flexibly maintain substantially parallel to the surface of the one of the one or more sidewalls;

the second portion of each protection tab of the at least one protection tab overlays a corresponding one of the one or more holes of the one or more user access areas of the one of the one or more sidewalls; and the second portion of each protection tab of the at least one protection tab is configured to flexibly maintain when sufficient force is applied to the second portion of each protection tab; and each protection tab of the at least one protection tab is configured such that a tip of each protection tab is in contact with a user input of the mobile communications device when each protection tab is in the second position of the second portion and the mobile communications device is contained within the rigid portion.

4. The mobile communications device enclosure of claim 1, wherein at least three sides of the movable portion of the ejection tab are at least partially defined by the channel.

5. The mobile communications device enclosure of claim 4, wherein the at least three sides of the movable portion of the ejection tab have an angular U-shape.

6. The mobile communications device enclosure of claim 1, wherein the movable portion of the ejection tab is at least partially defined by the channel and includes the substantially flat exterior surface and the substantially flat interior surface.

7. The mobile communications device enclosure of claim 1, wherein the movable portion of the ejection tab is at least partially defined by the channel;

the channel has a first curvilinear shape;

the movable portion of the ejection tab including a first side with a second curvilinear shape; and the first side is different from the substantially flat exterior surface and the substantially flat interior surface.

8. The mobile communications device enclosure of claim 1, wherein the rigid portion is configured such that the mobile communications device is ejected from the rigid portion when the mobile communications device is contained in the rigid portion and the ejection tab is moved into the second position of the movable portion of the ejection tab.

9. The mobile communications device enclosure of claim 1, wherein the one or more sidewalls include a hardware interface access area;

the hardware interface access area has a hole in one of the one or more sidewalls; and the hardware interface access area is configured to facilitate mechanical and electrical coupling of a hardware interface cable connector with a hardware interface dock connector of the mobile communications device.

10. A mobile communications case system configured to enclose a mobile communications device, the mobile communications case system comprising:

a case, the case comprising:

a rigid portion, the rigid portion of the case including a back wall and one or more sidewalls, the back wall and the one or more sidewalls defining an interior of the case and an exterior of the case, the rigid portion configured to enclose the mobile communications device within the interior of the rigid portion; and at least one protection tab, each protection tab comprising a first portion substantially perpendicular to one of the one or more sidewalls and a second portion coupled to the first portion and the one of the one or more sidewalls, the second portion substantially parallel to the one of the one or more sidewalls;

an ejection tab located at the back wall of the rigid portion, the ejection tab at least partially defined by a channel traversing from a first point in the rigid portion to a second point in the rigid portion, the ejection tab having a fixed portion and a movable portion, the fixed portion of the ejection tab is mechanically coupled to the rigid portion, the movable portion of the ejection tab having a first portion mechanically coupled to the fixed portion of the ejection tab and a second portion at least partially defined by the channel, wherein:

the movable portion of the ejection tab is configured to flexibly maintain a first position, the movable portion of the ejection tab further configured to shift to a second position partially within the interior of the rigid portion while sufficient force is applied to an exterior of the second portion of the movable portion of the ejection tab;

the one or more sidewalls have at least one user access area, each user access area has an aperture, each user access area configured to provide user access to a different portion of the mobile communications device when the mobile communications device is enclosed within the mobile communications case system;

each protection tab of the at least one protection tab is associated with a different one of the at least one user access area and mechanically coupled to the rigid portion;

each protection tab is further configured to overlie the aperture of the different one of the at least one user access area of one of the one or more sidewalls;

the ejection tab covers at least a portion of a rear surface of the mobile communications device when the interior of the rigid portion encloses the mobile communications device;

the back wall has an interior side and an exterior side;

the ejection tab has an interior side and an exterior side;

the interior side of the ejection tab and the interior side of the back wall form a substantially flat plane when the ejection tab is in the first position;

the interior side of the ejection tab and the interior side of the back wall have substantially identical surface designs; and the exterior side of the ejection tab comprises the exterior of the second portion of the movable portion of the ejection tab.

11. The mobile communications case system of claim 10, wherein:

the at least one protection tab is sized such that a surface area of each protection tab is less than a surface area of the aperture of the different one of the at least one user access area of the one of the one or more sidewalls.

12. The mobile communications case system of claim 10, wherein:

the second portion of each protection tab of the at least one protection tab is configured to flexibly maintain a first position substantially parallel to the one of the one or more sidewalls;

the second portion of the each protection tab of the at least one protection tab is configured to flexibly maintain a second position when sufficient force is applied; and each protection tab of the at least one protection tab is configured such that a tip of the at least one protection tab is in contact with a user input of the mobile communications device when the second portion of each protection tab is in its second position and the mobile communications device is contained within the rigid portion.

13. The mobile communications case system of claim 10, wherein:

the movable portion of the ejection tab is configured to be substantially parallel to an orientation of the back wall of the rigid portion and substantially coplanar with the back wall of the rigid portion when in the first position.

14. The mobile communications case system of claim 10, wherein at least three sides of the movable portion of the ejection tab are at least partially defined by the channel.

15. The mobile communications case system of claim 10, wherein the at least three sides of the movable portion of the ejection tab have an angular U-shape.

16. The mobile communications case system of claim 10, wherein the movable portion of the ejection tab is at least partially defined by the channel and includes the interior side of the ejection tab and the exterior side of the ejection tab.

17. The mobile communications case system of claim 10, wherein the movable portion of the ejection tab is at least partially defined by the channel;

the channel has a first curvilinear shape;

the movable portion of the ejection tab includes a first side with a second curvilinear shape; and the first side is different from the exterior side of the ejection tab and the interior side of the ejection tab.

18. The mobile communications case system of claim 10, wherein the rigid portion is configured such that when the mobile communications device is contained in the rigid portion and the ejection tab is moved into the second position of the movable portion of the ejection tab, the mobile communications device is ejected from the rigid portion.

19. The mobile communications case system of claim 10, wherein the one or more sidewalls include a hardware interface access area;

the hardware interface access area has a hole in one of the one or more sidewalls; and the hardware interface access area is configured to facilitate mechanical and electrical coupling of a hardware interface cable connector with a hardware interface dock connector of the mobile communications device.

20. A method of manufacturing a mobile communications device enclosure, the method comprising:

providing at least one machine tool for at least partially creating the mobile communications device enclosure;

manufacturing the mobile communications device enclosure using the at least one machine tool such that the mobile communications device enclosure comprises:

a rigid portion, the rigid portion including a back wall and one or more sidewalls, the back wall and the one or more sidewalls defining an interior of the mobile communications device enclosure and an exterior of the mobile communications device enclosure, the rigid portion configured to receive a mobile communications device within the interior of the mobile communications device enclosure, the one or more sidewalls include one or more user access areas, each user access area has a hole, each user access area is configured to provide user access to a different portion of the mobile communications device;

at least one protection tab, each protection tab of the at least one protection tab includes a first portion substantially perpendicular to one of the one or more sidewalls and a second portion coupled to the first portion of such protection tab and configured substantially parallel to a surface of the one of the one or more sidewalls, each protection tab of the at least one protection tab is associated with a different one of the one or more user access areas and mechanically coupled to the rigid portion, each protection tab is further configured to overlie the hole of the different one of the one or more user access areas of the one of the one or more sidewalls; and an ejection tab located at the back wall of the rigid portion, the ejection tab at least partially defined by a channel traversing from a first point in the rigid portion to a second point in the rigid portion, the ejection tab having a fixed portion and a movable portion, the fixed portion of the ejection tab mechanically coupled to the rigid portion, the movable portion of the ejection tab having a first portion mechanically coupled to the fixed portion of the ejection tab and a second portion at least partially defined by the channel, the ejection tab has at least one substantially flat surface, and the movable portion of the ejection tab has a thickness substantially equal to a thickness of the back wall of the rigid portion.

21. The method of claim 20, wherein manufacturing the mobile communications device enclosure using the at least one machine tool includes an injection molding process.

22. The method of claim 20, further comprising:

packaging the mobile communications device enclosure; and shipping the mobile communications device enclosure through a distribution channel.

23. The method of claim 20, further comprising: selling the mobile communications device enclosure; and shipping the mobile communications device enclosure through a distribution channel.

24. The method of claim 23, wherein the at least one protection tab is sized such that a surface area of each protection tab of the at least one protection tab is less than a surface area of the hole of the different one of the one or more user access areas of the one of the one or more sidewalls.

25. The method of claim 20, wherein at least three sides of the movable portion of the ejection tab are at least partially defined by the channel.

26. The method of claim 25, wherein the at least three sides of the movable portion of the ejection tab have an angular U-shape.

* * * * *